US010043456B1

(12) United States Patent
de Greef

(10) Patent No.: US 10,043,456 B1
(45) Date of Patent: Aug. 7, 2018

(54) CONTROLLER AND METHODS FOR ADJUSTING PERFORMANCE PROPERTIES OF AN ELECTROWETTING DISPLAY DEVICE

(71) Applicant: Amazon Technologies, Inc., Seattle, WA (US)

(72) Inventor: Petrus Maria de Greef, Waalre (NL)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 108 days.

(21) Appl. No.: 14/982,164

(22) Filed: Dec. 29, 2015

(51) Int. Cl.
*G09G 5/00* (2006.01)
*G06F 3/038* (2013.01)
*G09G 3/34* (2006.01)
*G09G 3/20* (2006.01)

(52) U.S. Cl.
CPC ......... *G09G 3/3406* (2013.01); *G09G 3/2003* (2013.01); *G09G 3/2074* (2013.01); *G09G 2310/08* (2013.01); *G09G 2330/021* (2013.01)

(58) Field of Classification Search
CPC ........ G02F 1/167; G02F 1/172; G02B 26/026
See application file for complete search history.

(56) References Cited

U.S. PATENT DOCUMENTS 8,749,478 B1 * 6/2014 Bowen .................. G09G 5/003 345/107
8,749,538 B2 * 6/2014 Webster ............... G09G 3/3466 345/102
9,153,181 B2 * 10/2015 Miyaguchi ............. G09G 3/344
9,495,915 B1 * 11/2016 Manyam ................ G09G 3/344
2005/0174341 A1 * 8/2005 Johnson .............. G02F 1/13306 345/204
2005/0248517 A1 * 11/2005 Luther Weindorf . G09G 3/3208 345/82
2006/0022993 A1 * 2/2006 Hammond ........... H04N 1/6027 345/590
2006/0291122 A1 * 12/2006 Zhou ...................... G09G 3/344 361/103
2007/0109447 A1 * 5/2007 Yamashita .............. G06T 5/004 348/602
2007/0165048 A1 * 7/2007 Yamashita .............. G06T 5/009 345/601
2008/0002095 A1 * 1/2008 Kanade ............. G02F 1/133514 349/62
2008/0037104 A1 * 2/2008 Hagood ................. G02B 26/00 359/292
2008/0062500 A1 * 3/2008 Hagood, IV ......... G02B 6/0043 359/230

(Continued)

*Primary Examiner* — William Lu
(74) *Attorney, Agent, or Firm* — Brinks Gilson & Lione

(57) ABSTRACT

A display device includes a first support plate and a second support plate opposite the first support plate. A plurality of pixel regions are positioned between the first support plate and the second support plate and arranged in a plurality of rows and a plurality of columns. A controller is configured to: determine that a measured operating condition value for a first performance property of the display device is outside an operating range for the first performance property; adjust a first value for a first device parameter to an adjusted first value based on the measured operating condition value; and adjust a second value for a second device parameter to an adjusted second value based on the measured operating condition value.

15 Claims, 8 Drawing Sheets

(56) References Cited

U.S. PATENT DOCUMENTS

| | | | | |
|---|---|---|---|---|
| 2008/0180385 | A1* | 7/2008 | Yoshida | G09G 3/20 345/102 |
| 2008/0297880 | A1* | 12/2008 | Steckl | G02B 26/004 359/291 |
| 2009/0284513 | A1* | 11/2009 | Weindorf | G09G 3/3696 345/211 |
| 2010/0149145 | A1* | 6/2010 | Van Woudenberg | G09G 3/34 345/207 |
| 2013/0113841 | A1* | 5/2013 | Choi | H05B 33/0815 345/690 |
| 2014/0028858 | A1* | 1/2014 | Wu | H04N 17/04 348/189 |
| 2014/0063039 | A1* | 3/2014 | Drzaic | G09G 5/02 345/589 |
| 2014/0071383 | A1* | 3/2014 | Drolet | G02F 1/13306 349/72 |
| 2014/0139571 | A1* | 5/2014 | Albrecht | G09G 5/02 345/694 |
| 2016/0335958 | A1* | 11/2016 | Huang | G09G 3/3413 |

* cited by examiner

CONTROLLER AND METHODS FOR ADJUSTING PERFORMANCE PROPERTIES OF AN ELECTROWETTING DISPLAY DEVICE

BACKGROUND

Many portable electronic devices include displays for displaying various types of images. Examples of such displays include electrowetting displays (EWDs), liquid crystal displays (LCDs), electrophoretic displays (EPDs), and light emitting diode displays (LED displays). In EWD applications, an addressing scheme is utilized to drive the pixel regions of the EWD. Generally, one point of emphasis for EWDs intended to be used in mobile and portable media devices is reducing power consumption while maintaining image quality.

An input video or data stream generally represents a sequence of display data values grouped per line; a sequence of lines grouped per frame; and a sequence of frames defining a frame sequence, such as a moving video stream (e.g., a movie). When such a video stream is to be reproduced on an active matrix EWD, a timing controller and one or more display drivers may be used to process the incoming data stream to control the pixel regions of the EWD. The purpose of an addressing scheme is to set and/or maintain the state of a pixel region. The addressing scheme drives an active matrix transistor array and provides analog voltages to individual pixel regions of the EWD. The pixel regions are grouped per row and when a row is addressed, voltages of a complete row are stored as charge on corresponding pixel region capacitors. As the display data is repeatedly updated, still and moving images are reproduced by the EWD.

BRIEF DESCRIPTION OF THE DRAWINGS

The detailed description includes reference to non-limiting and non-exhaustive embodiments illustrated in the accompanying figures. The same reference numerals in different figures refer to similar or identical items.

DETAILED DESCRIPTION

Figure 1:
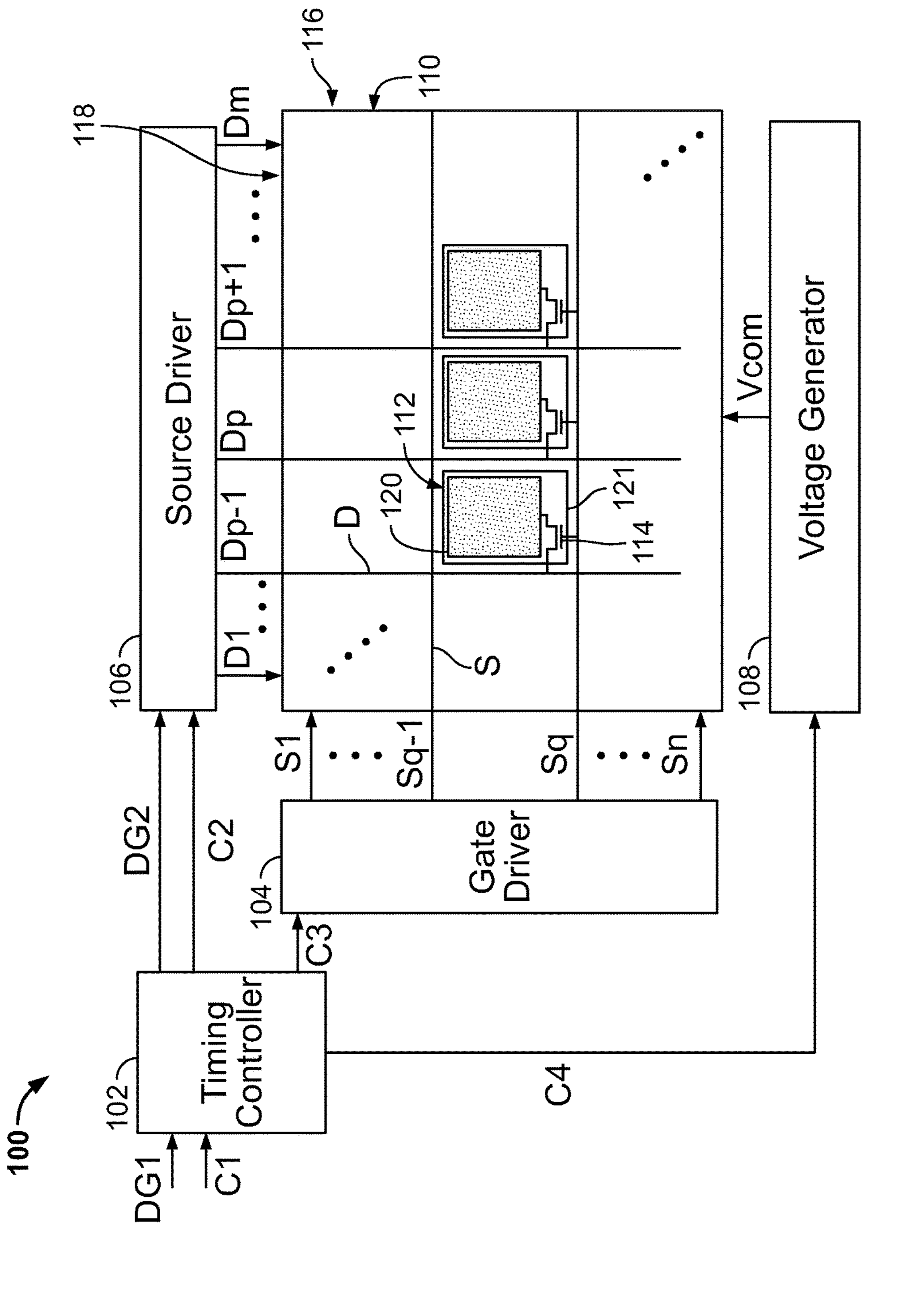
FIG. 1 is a schematic view of an example electrowetting display device, according to various embodiments.

The present disclosure provides schemes and techniques that provide for adaptive balancing of image quality (e.g., contrast, brightness, and/or color saturation) and power consumption while driving electrowetting display devices. As described herein, a display device, such as an electrowetting display device includes a controller, e.g., a timing controller, to determine that a measured operating condition value for a first performance property of the display device is outside an operating range for the first performance property. The controller adjusts a first value for a first device parameter to an adjusted first value based on the measured operating condition value and adjust a second value for a second device parameter to an adjusted second value based on the measured operating condition value. In the example embodiments, the controller generates an adjusted operating condition value, $\alpha$, within an adjusted operating range for the first performance property, and sets an adjusted first value for the first device parameter and sets an adjusted second value for the second device parameter based on the adjusted operating condition value.

To reduce power consumption of an electronic device, the activity of the display panel may be reduced; however, at least some techniques to reduce power consumption may also compromise display quality. In certain applications as disclosed herein, depending on the application, image content and/or ambient conditions, image quality improvements can be exchanged for reduced power consumption. For example, when image quality is essential, more than average power can be used to provide the enhanced image quality. Conversely, when the application, image content and/or ambient light conditions allow, power can be preserved while maintaining the required image quality. Moreover, when the application, image content and/or ambient light conditions allow, image quality can be allowed to degrade in a controlled way, in order to save power. As disclosed herein, novel driving techniques optimize the color creation process of electrowetting display devices based, at least in part, on ambient conditions.

In at least some conventional color displays, RGB pixel regions are utilized to render colors, as presented by standard input image-data or video-data. A white pixel region may be added to reproduce image-data, in order to improve the brightness and the efficiency of color rendering. The white pixel region can be implemented as an extra sub-pixel in addition to a red sub-pixel, a green sub-pixel and a blue sub-pixel, or as a part of the R, G and/or B sub-pixels (in-cell-white).

In this disclosure, the brightness and efficiency of color rendering can be improved by adding a white primary sub-pixel, using RGBW sub-pixels to reproduce image-data. The white sub-pixel may be implemented as an extra sub-pixel or, alternatively, as a part of the RGB pixel, referred to herein as "in-cell-white" sub-pixel.

Electrowetting displays are typically used in reflective mode. In bright ambient conditions, the electrowetting displays may reflect a lot of light, yet in dark ambient conditions their brightness is limited and a front-light can be used to expose the pixel regions of the electrowetting display with additional light. In bright ambient conditions, the front-light has no impact. It can be dimmed or turned off, to save energy. An ambient light sensor can be used to measure the ambient light condition, to be used as input for a control unit which controls the front-light.

As described herein, ambient light dependent brightness reduction can be used to enhance the color saturation and save power of an electrowetting display. Saturation can be enhanced by dimming the White component of the sub-pixel video-data and power can be saved by reducing the drive voltage of the pixels. Both controls are at the cost of contrast and brightness. However, when the display has sufficient brightness due to bright ambient lighting conditions (e.g., daylight), this is less an issue. For RGBW panels, saturation and drive voltage can be controlled independently. For in-cell-white pixel regions, a reduced drive voltage saves power and implicitly also increases the color saturation of bright pixel regions, without the need for any additional video processing.

As described herein, image-data dependent contrast can be measured and used to gain the image-data, and at the same time attenuate the display contrast by reducing the driving voltage of the electrowetting display. Power is saved in the linear current sources of the display driver, without compromising the image quality. Additionally or alternatively, a temperature stabilized brightness control can be used to adjust the contrast and power consumption of an electrowetting display, by controlling the driving voltage of the pixel regions. Contrast can also be boosted at the cost of extra energy, without compromising system integrity. Alternatively, the contrast can be dimmed to save energy. The energy consumption has an impact on temperature of the display drivers, which should remain within specified limits of the operating conditions. In certain embodiments, the temperature is estimated on the basis of addressing rate, image-data or driving voltage; or the temperature can be measured with a suitable temperature sensor in the display driver, for example. In a particular embodiment, a control loop adjusts the power consumption such that the temperature of the display drivers does not exceed a maximum operating condition.

Although in the following disclosure, embodiments of an example electrowetting display device having an electrowetting display (EWD) are described and shown, the schemes and techniques are suitable for use with other displays including, without limitation, liquid crystal displays (LCDs), electrophoretic displays (EPDs), light-emitting diode displays (LED displays), organic light-emitting diode displays (OLED displays), and plasma displays. A pixel region may include an electrowetting element, one or more pixels, one or more pixels each including a plurality of sub-pixels, or one or more sub-pixels of an electrowetting display device. Such an electrowetting element, pixel or sub-pixel may be the smallest light transmissive, reflective or transflective component of an electrowetting display that is individually operable to directly control an amount of light transmission through and/or reflection from the pixel region. For example, in some implementations, a pixel region may include a pixel having a red sub-pixel, a green sub-pixel, a blue sub-pixel, and a white sub-pixel. In other implementations, a pixel region may include a pixel that is a smallest component of the electrowetting display, i.e., the pixel does not include any sub-pixels.

In general, electronic display devices including, without limitation, portable computing devices, tablet computers, laptop computers, notebook computers, mobile phones, personal digital assistants (PDAs), and portable media devices (e.g., e-book devices and DVD players), display images on a display. Such displays may include, for example, EWDs, LCDs, EPDs, and LED displays.

More particularly, an electronic display device, such as an electrowetting display device, includes a thin film transistor electrowetting display (TFT-EWD) having an array of transmissive, reflective or transflective pixel regions configured to be operated by an active matrix addressing scheme. As described above, a pixel region may, unless otherwise specified, include an electrowetting element, one or more pixels, one or more pixels each including a plurality of sub-pixels, or one or more sub-pixels of an electrowetting display device. For example, rows and columns of pixel regions, e.g., pixels or sub-pixels, are operated by controlling voltage levels on a plurality of source lines and a plurality of gate lines. In this fashion, the electronic display device can produce an image by selecting particular pixel regions to transmit, reflect or block light. Pixel regions are addressed (e.g., selected) via source lines and gate lines that are connected to corresponding transistors (e.g., used as switches) associated with each pixel region. In certain embodiments, these transistors take up a relatively small fraction of the area of each pixel region. For example, in certain embodiments, the transistor is located underneath the reflector in reflective displays.

An electrowetting display employs an applied voltage to change the surface tension of a liquid in relation to a surface. For instance, by applying a voltage to a hydrophobic surface via a pixel region electrode in conjunction with a common electrode, the wetting properties of the surface can be modified so that the surface becomes increasingly hydrophilic. In general, the term "hydrophobic" refers to the ability of a material or surface to repel water or polar fluids, while the term "hydrophilic" generally refers to a material or surface having an affinity for water or polar fluids. As one example of an electrowetting display, a voltage is applied to the display to modify a surface tension within one or more pixel regions causing an electrowetting liquid in the individual pixel regions of the display to adjoin the modified surface and, thus, replace a colored electrowetting oil layer in the individual pixel regions of the display. The electrowetting fluids in the individual pixel regions of the display responding to the change in surface tension act as an optical switch. When the voltage is absent, the colored electrowetting oil forms a continuous film on the hydrophobic surface within a pixel region, and the color may thus be visible to a user of the display. On the other hand, when the voltage is applied to the pixel region, the colored electrowetting oil is displaced and the pixel region becomes transparent. When multiple pixel regions of the display are independently activated, the display can present a color or grayscale image. The pixel regions may form the basis for a transmissive, reflective, or transmissive/reflective (transreflective) display. Further, the pixel regions may be responsive to high switching speeds (e.g., on the order of several milliseconds), while employing small pixel region dimensions. Accordingly, the electrowetting displays described herein may be suitable for applications such as displaying video content. In addition, the low power consumption of electrowetting displays in general makes the technology suitable for displaying content on portable display devices that rely on battery power.

Generally, a dedicated gate scanning algorithm is implemented to drive electrowetting displays. For example, a first write action discharges a pixel region to a reset level, e.g., a black level voltage, which is also generally referred to as a reset of the pixel region.

The power consumption of an electrowetting display depends on the electrowetting display's physical properties, as well as image content. The power consumption of an electrowetting display can be modeled as an array of capacitors (corresponding to pixel regions), which are continuously charged and discharged with new image data. In certain embodiments, the most relevant parameters are capacitive load (of the pixel regions and the electrowetting display), drive voltage for the pixel regions and the addressing rate for the pixel regions. These parameters determine the rate and charge required to readdress the electrowetting display, according the following formula:

$$p=\Sigma_1^{height}\Sigma_1^{width}(a*f*C*V^2),$$

where "P" represents power required for a display driver of the electrowetting display, "height" represents the number of rows of pixel regions of the electrowetting display, "width" represents the number of columns of pixel regions of the electrowetting display, "a" represents an activity factor that depends on image content and generally corresponds to temporal activity of a source driver of the electrowetting display, "f" represents a frequency of addressing the pixel regions in the electrowetting display, "C" represents a capacitive load of the pixel regions in the electrowetting display, and "V" represents a voltage output by the display driver. In certain conditions, the display driver for the electrowetting display may consume too much energy for a given application.

The image quality perceived by a viewer of the electrowetting display is affected by brightness variations of the electrowetting display due to leakage (voltage leakage from storage capacitors of the pixel regions of the electrowetting display), backflow (fluid movement within the pixel regions of the electrowetting display) and reset pulses (resetting of pixel regions within the electrowetting display). The brightness variations depend on physical properties of the electrowetting display, as well as the input frame rate from the image source, the repeat rate for mitigating leakage, the refresh rate for mitigating backflow, and the reset pulse intensity.

Referring to FIG. 1, an example electrowetting display 100 is schematically illustrated. Electrowetting display 100 includes a timing controller 102, a gate or row driver (scan driver) 104, a source or column driver (data driver) 106, a voltage generator 108, and an electrowetting display panel 110. Electrowetting display panel 110 is driven by timing controller 102, gate driver 104, source driver 106 and voltage generator 108.

As an example of general operation of electrowetting display 100, in one embodiment, responsive to a first data signal DG1 and a first control signal C1 from an external image source, e.g., a graphic controller (not shown in FIG. 1), timing controller 102 transmits a second data signal DG2 and a second control signal C2 to source driver 106, a third control signal C3 to gate driver 104, and a fourth control signal C4 to voltage generator 108. Electrowetting display panel 110 includes m data lines D, i.e., source lines, to transmit the data voltages and n gate lines S, i.e., scan lines, to transmit a gate-on signal to TFTs 114 to control pixel regions 112. Thus, timing controller 102 controls gate driver 104 and source driver 106. Timing controller 102 transmits second data signal DG2 and a second control signal C2 to source driver 106, third control signal C3 to gate driver 104, and fourth control signal C4 to voltage generator 108 to drive pixel regions 112. Gate driver 104 sequentially transmits scan signals S1, . . . , Sq−1, Sq, . . . Sn to electrowetting display panel 110 in response to third control signal C3 to activate rows of pixel regions 112 via the gates of TFTs 114. Source driver 106 converts second data signal DG2 to voltages, i.e., data signals, and transmits the data signals D1, . . . , Dp−1, Dp, Dp+1, . . . , Dm to sources of TFTs 114 of pixel regions 112 within an activated row of pixel regions 112 to thereby activate (or leave inactive) pixel regions 112.

Source driver 106 converts second data signal DG2 to voltages, i.e., data signals, and applies the data signals D1, . . . , Dp−1, Dp, Dp+1, . . . , Dm to electrowetting display panel 110. Gate driver 104 sequentially transmits scan signals S1, . . . , Sq−1, Sq, . . . , Sn to electrowetting display panel 110 in response to third control signal C3. Voltage generator 108 applies a common voltage Vcom to electrowetting display panel 110 in response to fourth control signal C4. Although not illustrated in FIG. 1, voltage generator 108 generates various voltages required by timing controller 102, gate driver 104, and source driver 106.

A plurality of pixel regions 112 are positioned adjacent to crossing points of the data lines D and the gate lines S and, thus, are arranged in a grid having a plurality of rows of pixel regions referred to herein as rows 116 and a plurality of columns of pixel regions referred to herein as columns 118. Each pixel region 112 includes a hydrophobic surface (not illustrated in FIG. 1), a thin film transistor (TFT) 114, and a pixel region electrode 120 under the hydrophobic surface. Each pixel region 112 may also include a storage capacitor (not illustrated) under the hydrophobic surface. A plurality of intersecting partition walls 121 separates pixel regions 112. Pixel regions 112 can represent, for example, pixels within electrowetting display 100 or sub-pixels within electrowetting display 100, depending on the application for electrowetting display 100.

Figure 2:
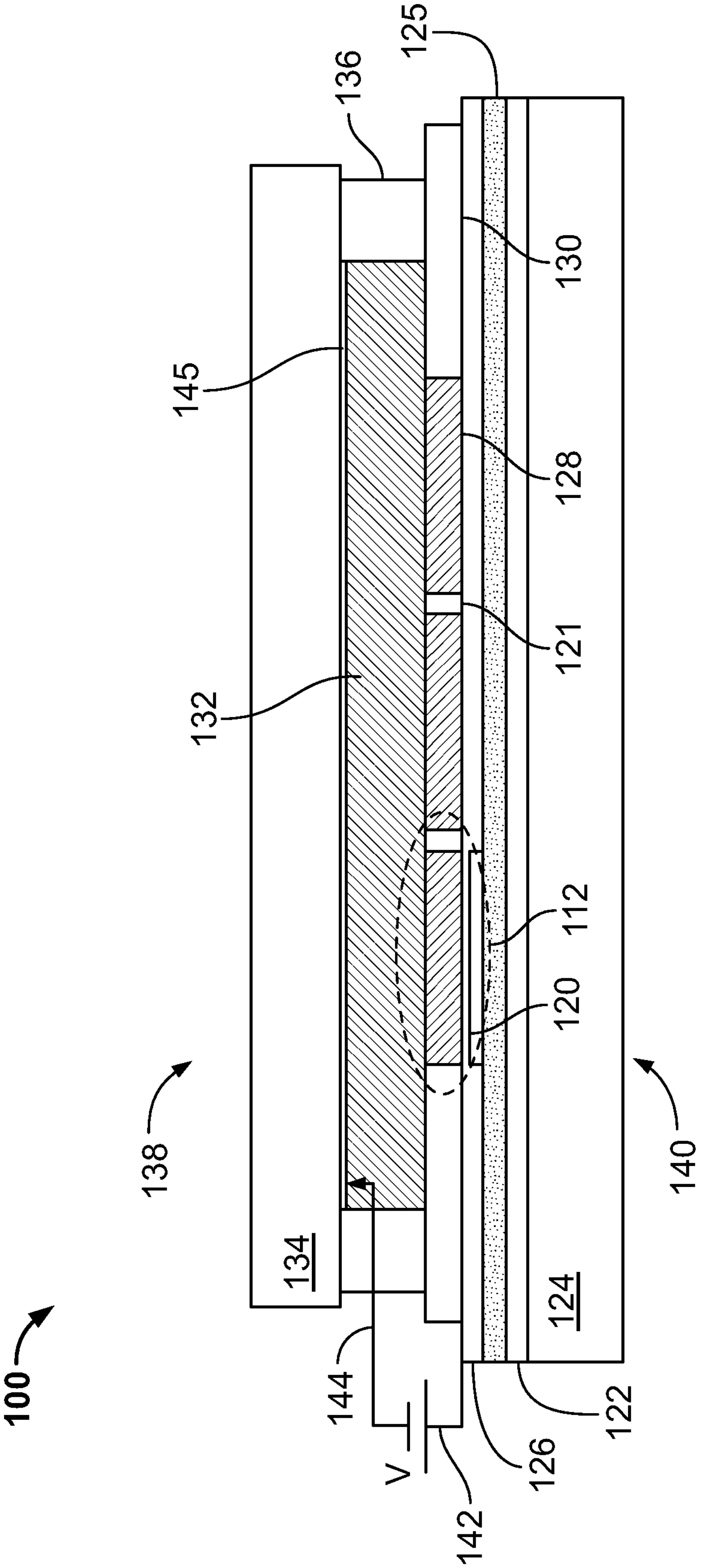
FIG. 2 is a cross-section view of a portion of the electrowetting display device of FIG. 1, according to various embodiments.

FIG. 2 is a cross-section view of a portion of electrowetting device 100 showing several pixel regions 112, according to various embodiments. An electrode layer 122 that includes pixel region electrodes 120 is formed on a first or bottom support plate 124. Thus, electrode layer 122 is generally divided into portions that serve as pixel region electrodes 120.

In some implementations, a dielectric barrier layer 125 may at least partially separate electrode layer 122 from a hydrophobic layer 126 also formed over electrode layer 122. While optional, dielectric barrier layer 125 may act as a barrier that prevents electrolyte components (e.g., an electrolyte solution) from reaching electrode layer 122. In certain embodiments, dielectric barrier layer 125 includes a silicon dioxide layer (e.g., having a thickness of about 0.2 microns) and a polyimide layer (e.g., having a thickness of about 0.1 micron), though claimed subject matter is not so limited. In some implementations, hydrophobic layer 126 includes a fluoropolymer resin, such as, for example, Teflon® AF1600, produced by DuPont, based in Wilmington, Del.

Pixel walls 121 form a patterned pixel region grid on hydrophobic layer 126, as shown in FIG. 1. In one embodiment, pixel walls 121 include a photoresist material, such as, for example, an epoxy-based negative photoresist SU-8. As described above, the patterned pixel region grid includes a plurality of pixel regions 112 arranged in a plurality of rows 116 and a plurality of columns 118 that form a pixel region array (e.g., electrowetting display panel 110). For example, in certain embodiments, pixel region 112 can have a width and a length in a range of about 50 microns to 500 microns. A first fluid 128, e.g., a liquid, which in certain embodiments has a thickness of 1 micron to 10 microns, for example, overlies hydrophobic layer 126. First fluid 128 is electrically non-conductive, e.g., an opaque oil retained in the individual electrowetting pixel regions 112 by pixel walls 121 of the patterned pixel region grid. An outer rim 130 may include the same material as pixel walls 121.

A second fluid 132, e.g., a liquid, overlies first fluid 128 and pixel walls 121 of the patterned pixel region grid. In certain embodiments, second fluid 132 is an electrolyte fluid or solution that is electrically conductive or polar and may be a water or a salt solution, such as a solution of potassium chloride in water. Second fluid 132 may be transparent, but may be colored, or light-absorbing. Second fluid 132 is immiscible with first fluid 128. In general, substances are immiscible with one another if the substances do not substantially form a solution, although in a particular embodiment second fluid 132 might not be perfectly immiscible with first fluid 128. In general, an "opaque" fluid is a fluid that appears black to an observer. For example, an opaque fluid strongly absorbs a broad spectrum of wavelengths (e.g., including those of red, green and blue light) in the visible region of electromagnetic radiation appearing black. However, in certain embodiments an opaque fluid may absorb a relatively narrower spectrum of wavelengths in the visible region of electromagnetic radiation and may not appear perfectly black.

In some embodiments, the opaque fluid is a nonpolar electrowetting oil. In certain embodiments, first fluid 128 may absorb at least a portion of the visible light spectrum. First fluid 128 may be transmissive for a portion of the visible light spectrum, forming a color filter. For this purpose, first fluid 128 may be colored by addition of pigment particles or a dye. Alternatively, first fluid 128 may be black, for example by absorbing substantially all portions of the visible light spectrum, or reflecting. A reflective first fluid 128 may reflect the entire visible light spectrum, making the layer appear white, or a portion of the entire visible light spectrum, making the layer have a color. In example embodiments, first fluid 128 is black and, therefore, absorbs substantially all portions of an optical light spectrum, for example, in the visible light spectrum.

Hydrophobic layer 126 is arranged on bottom support plate 124 to create an electrowetting surface area. The hydrophobic character causes first fluid 128 to adjoin preferentially to bottom support plate 124 because first fluid 128 has a higher wettability with respect to the surface of hydrophobic layer 126 than second fluid 132. Wettability relates to the relative affinity of a fluid for the surface of a solid. Wettability increases with increasing affinity, and it can be measured by the contact angle formed between the fluid and the solid and measured internal to the fluid of interest. For example, such a contact angle can increase from relative non-wettability of more than 90° to complete wettability at 0°, in which case the fluid tends to form a film on the surface of the solid.

A second or top support plate 134 is opposite bottom support plate 124 to cover edge seals 136 and retain first fluid 128 and second fluid 132 over the pixel region array. Bottom support plate 124 and top support plate 134 may be separate parts of individual pixel regions 112 or bottom support plate 124 and top support plate 134 may be shared by a plurality of pixel regions 112. Bottom support plate 124 and top support plate 134 may be made of a suitable glass or polymer material and may be rigid or flexible, for example.

A voltage V applied across second fluid 132 and the dielectric barrier layer stack (e.g., hydrophobic layer 126) of individual pixel regions 112 can control transmittance or reflectance of the individual pixel regions 112. More particularly, in certain embodiments, electrowetting display 100 may be a transmissive, reflective or transflective display that generally includes an array of pixel regions 112, as shown in FIG. 1, configured to be operated by an active matrix addressing scheme. For example, rows 116 and columns 118 of pixel regions 112 are operated by controlling voltage levels on a plurality of source lines (e.g., source lines D of FIG. 1) and gate lines (e.g., gate lines S of FIG. 1). In this fashion, electrowetting display 100 may produce an image by selecting particular pixel regions 112 to at least partly transmit, reflect or block light.

Electrowetting display device 100 has a viewing side 138 on which an image formed by electrowetting display device 100 can be viewed, and an opposite rear side 140. In an example embodiment, top support plate 134 faces viewing side 138 and bottom support plate 124 faces rear side 140. In this embodiment, top support plate 134 is coupled to bottom support plate 124 with an adhesive or sealing material 136. In an alternative embodiment, electrowetting display device 100 may be viewed from rear side 140. Electrowetting display device 100 may be a reflective, transmissive or transreflective type. Electrowetting display device 100 may be a segmented display type in which the image is built up of segments. The segments can be switched simultaneously or separately. Each segment includes one pixel region 112 or a number of pixel regions 112 that may be neighboring or distant from one another. Pixel regions 112 included in one segment are switched simultaneously, for example. Electrowetting display device 100 may also be an active matrix driven display type or a passive matrix driven display, for example.

Referring to FIG. 2, electrode layer 122 is separated from first fluid 128 and second fluid 132 by an insulator, which may be hydrophobic layer 126. Electrode layer 122 (and thereby pixel region electrodes 120) is supplied with voltage signals V by a first signal line 142 as will be further described herein. A second signal line 144 is electrically connected to a top electrode 145 that is in contact with the conductive second fluid 132. This top electrode may be common to more than one pixel region 112 because pixel regions 112 are in fluid communication with and may share second fluid 132 uninterrupted by pixel walls 121. Pixel regions 112 are controlled by the voltage V applied between first signal line 142 and second signal line 144.

First fluid 128 absorbs at least a part of the optical spectrum. First fluid 128 may be transmissive for a part of the optical spectrum, forming a color filter. For this purpose, first fluid 128 may be colored by addition of pigment particles or dye, for example. Alternatively, first fluid 128 may be black (e.g., absorbing substantially all parts of the optical spectrum) or reflecting. Hydrophobic layer 126 may be transparent. A reflective layer positioned under hydrophobic layer 126 may reflect the entire visible light spectrum, making the layer appear white, or reflect a portion of the visible light spectrum, making the layer have a color.

When the voltage V applied between first signal line 142 and second signal line 144 is set at a non-zero active signal level, pixel region 112 will enter into an active state. Electrostatic forces will move second fluid 132 toward electrode layer 122, thereby displacing first fluid 128 from the area of hydrophobic layer 126 towards, for example, pixel wall 121 surrounding the area of hydrophobic layer 126, to a droplet-like shape. This action uncovers at least part of first fluid 128 from the surface of hydrophobic layer 126 of pixel region 112. When the voltage across pixel region 112 is returned to an inactive signal level of zero volts or a value near to zero volts, pixel region 112 will return to an inactive state, and first fluid 128 flows back to cover hydrophobic layer 126. In this way, first fluid 128 forms an electrically controllable optical switch in each pixel region 112.

Generally, thin film transistor 114 includes a gate electrode that is coupled to, such as electrically connected to, a corresponding scan line of the scan lines S, a source electrode that is coupled to, such as electrically connected to, a corresponding data line of the data lines D, and a drain electrode that is coupled to, such as electrically connected to, pixel region electrode 120. Thus, pixel regions 112 are operated, i.e., by driving electrowetting display 100, based on the scan lines S and the data lines D as shown in FIG. 1.

For driving electrowetting displays via the scan lines S and the data lines D, a dedicated gate scanning algorithm may generally be implemented. The gate scanning algorithm generally defines an address timing for addressing rows of pixel regions 112. Within each input frame, each row 116 (corresponding to the scan lines S) of pixel regions 112 within electrowetting display 100 generally needs to be written to twice. On occasion, the amount of writing can be more, depending on the actual drive scheme implementation. In general, the first write action discharges pixel region 112 to a reset level, e.g., a black level voltage, which is also referred to as a reset of pixel region 112. The second write action generally charges pixel region 112 to an actual required display data value. Often, pixel regions 112 may need to be refreshed to maintain their appearance when the corresponding data value for a particular pixel region 112 does not change. This is especially true when electrowetting display 100 is displaying a still image when all of pixel regions 112 may need to be refreshed. A refresh sequence generally involves a reset sequence followed by a repeat sequence, which recharges pixel regions 112 with their display data values.

Figure 3:
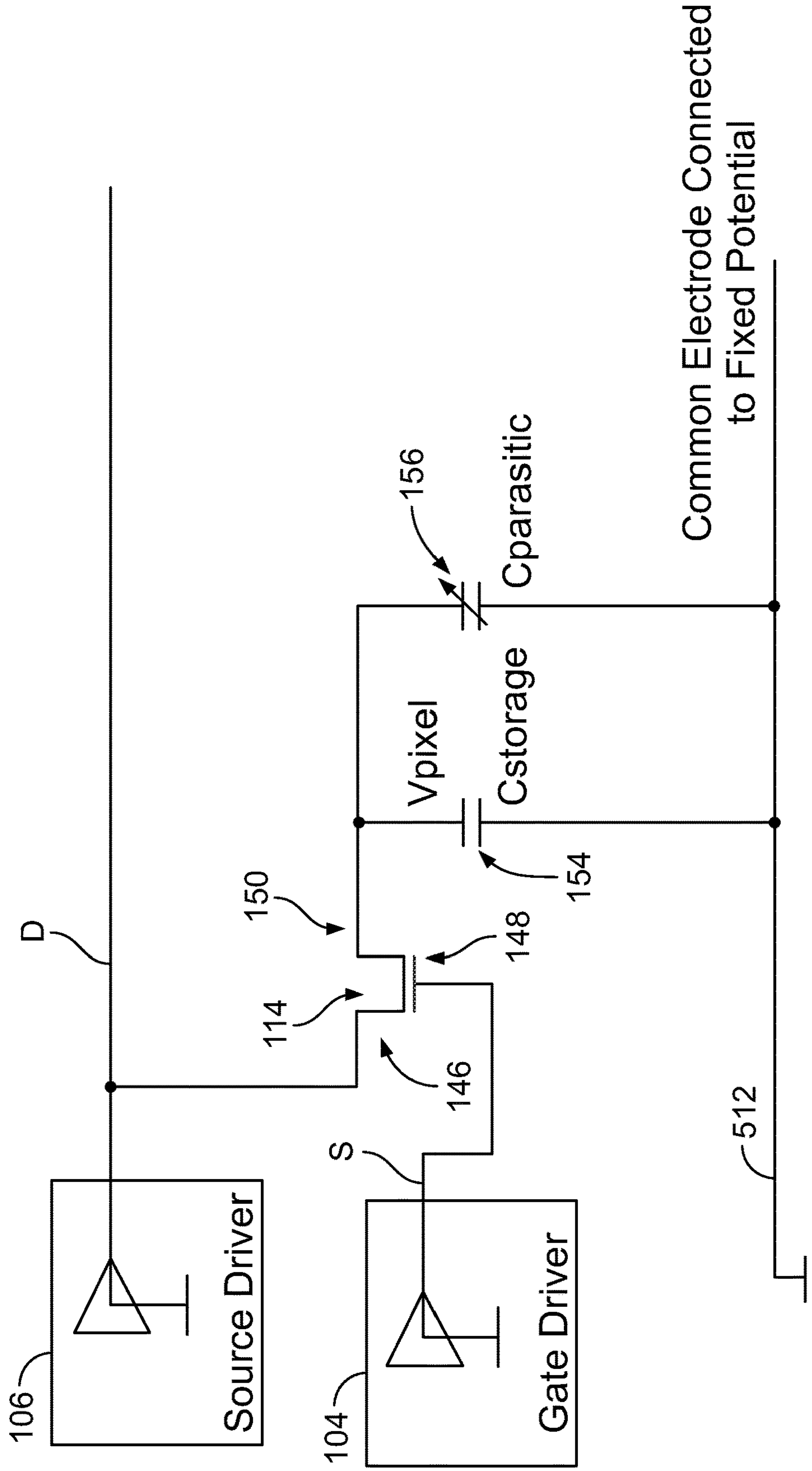
FIG. 3 is a schematic view representing example circuitry for pixel regions within the electrowetting display of FIGS. 1 and 2, according to various embodiments.

FIG. 3 schematically illustrates an arrangement of thin film transistor (TFT) 114 for pixel region 112 within electrowetting display 100. Each pixel region 112 within electrowetting display 100 generally includes such an arrangement. Source driver 106 is coupled to a data line D. The data line D is coupled to a source 146 of TFT 114 for pixel region 112. A scan line S is coupled to a gate 148 of TFT 114. The scan line S is coupled to gate driver 104. A drain 150 of TFT 114 is coupled to a common line 152 that is coupled to a fixed potential of a common electrode (not shown in FIG. 3) within electrowetting display 100. Common line 152 is also coupled to ground. A storage capacitor 154 ("Cstorage"), is provided between TFT 114 and common line 152. A variable parasitic capacitor 156, ("Cparasitic"), representing a variable parasitic capacitance, is present in each pixel region 112 between drain 150 of TFT 114 and common line 152.

When utilizing electrowetting display 100, the image quality perceived by the viewer can be affected by brightness or luminance variations of electrowetting display 100 due to capacitor leakage (charge leakage from storage capacitors of pixel regions 112), backflow (fluid movement within pixel regions 112) and reset pulses (resetting of pixel regions 112). The luminance variations depend on physical properties of the electrowetting display, as well as the input frame-rate from the image source, the repeat rate for mitigating leakage and the refresh rate for mitigating backflow and reset pulse intensity.

After the storage capacitor of a particular pixel region 112 is set to a particular potential, the capacitor slowly leaks charge, effectively reducing the driving voltage of that particular pixel region 112. Charge may leak from the capacitor due to current flow through active matrix switches and the dielectric materials making up the pixel region's capacitor, for example. As the charge stored in the storage capacitor leaks out, the electric potential formed between the pixel region's common line 152 and data line gradually diminishes. As that potential grows smaller, the electric fields that cause second fluid 132 to move into pixel region 112 are, in turn, reduced. A smaller displacement of first fluid 128 results in pixel region 112 appearing to grow dimmer. In electrowetting device 100 that relies on reflectance, this will result in the pixel region's reflectance being diminished over time.

If the electrowetting pixel region 112 were to be readdressed every single addressing cycle, the pixel region's reflectance would not fall significantly due to capacitor leakage (by reapplication of the target driving voltage). In such an implementation, a viewer of the display device may not notice any reductions or variations in reflectance at all. Such an approach, however, could utilize a relatively large amount of power. In a mobile application, this could result in the device's power source (i.e., battery) being quickly depleted.

Accordingly, in some applications, the frequency of readdressing is reduced to minimize power consumption. Although potentially improving the efficiency of the display device, as the frequency of readdressing is reduced, variations in pixel region reflectance can become more noticeable to the viewer. When a reset process occurs at the same time as readdressing, the timing controller may be configured to not readdress pixel region 112 and instead execute the reset process. This is because the reset process renders the readdressing of pixel region 112 unnecessary.

Another source of periodic reduction in reflectance of pixel region 112 includes backflow and reset pulses. As discussed above, after the capacitor of pixel region 112 has been set to a particular driving voltage, even without leakage from the capacitor, the fluids of pixel region 112 will exhibit backflow. This is a tendency of the liquids, even when subjected to constant electrostatic forces, to return to their original resting condition. This tendency, therefore, causes pixel region 112 to gradually lose reflectance over time as first fluid 128 returns to its resting position covering the entire pixel region 112. In order to correct the backflow effect, pixel region 112 is reset.

Resetting pixel region 112 involves first and second write actions. In a first write action, pixel region 112 is driven with a minimal driving voltage, thereby resetting the position of the first fluid within pixel region 112, effectively closing pixel region 112. The minimal driving voltage may be equal to zero volts or could be a driving voltage that is below a particular threshold, where the threshold is the maximum voltage at which pixel region 112 will close.

After pixel region 112 has been driven with the minimal driving voltage in the first write action, in a second write action pixel region 112 is subjected to a driving voltage corresponding to the desired reflectance for pixel region 112. In some cases, the pixel region's capacitor will not be sufficiently charged by subjecting the capacitor to the desired driving voltage for a single address period. As such, the second write action may involve subjecting the pixel region's capacitor to the desired driving voltage for two or more address cycles. Both the backflow tendency and the reset procedure can cause undesired reductions in a pixel region's reflectance from the target reflectance value.

Figure 4:
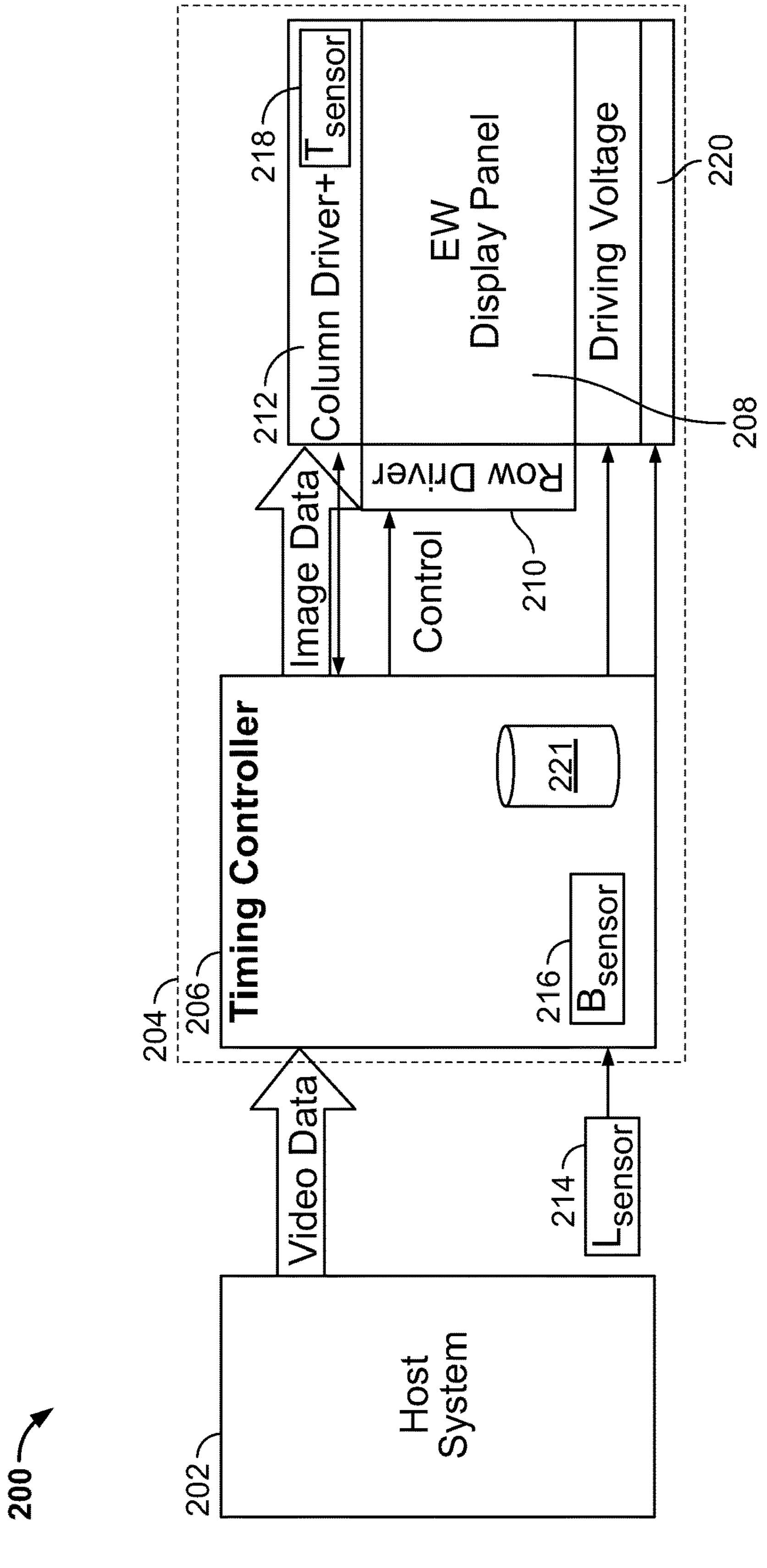
FIG. 4 is a schematic view of a simplified arrangement for a portion of an example electrowetting display device, according to various embodiments.

FIG. 4 shows an arrangement for a portion of an example electrowetting display device 200. As shown in FIG. 4, electrowetting display device 200 includes a host system 202, e.g., a graphic controller or image source, coupled to, such as in signal communication with, an electrowetting display 204 similar to electrowetting display 100. In one embodiment, electrowetting display 204 includes a timing controller 206, an electrowetting display panel 208 (similar to electrowetting display panel 110) including a plurality of pixel regions, positioned between bottom support plate 124 and top support plate 134, and arranged in a grid having a plurality of rows 116 and a plurality of columns 118, as shown in FIG. 1. Timing controller 206 is coupled to, such as in signal communication with, a row driver 210 configured to transmit signals to each row 116 and a column driver 212 configured to transmit signals to each column 118. Timing controller 206 is configured to control each of row driver 210 and column driver 212 to drive pixel regions 112 using one or more addressing schemes that are included in timing controller 206 as either software or firmware. In one embodiment, timing controller 206 generally corresponds to timing controller 102 of electrowetting display 100, row driver 210 generally corresponds to gate driver 104 of electrowetting display 100, and column driver 212 generally corresponds to source driver 106 of electrowetting display 100.

In the example embodiment shown in FIG. 4, electrowetting display device 200 includes one or more suitable sensors. Each sensor is coupled to, such as in signal communication with, timing controller 206 and configured to detect and/or measure one or more operating condition values for one or more performance properties of electrowetting display device 200. For example, in one embodiment, each sensor is configured to measure one or more operating condition values for one or more respective performance properties and transmit to timing controller 206 a corresponding signal indicative of a measured operating condition value for use in adjusting one or more device parameters for one or more components of electrowetting display device 200 to maintain, enhance or optimize performance of electrowetting display device 200. In a particular embodiment, electrowetting display device 200 includes one or more light sensors 214 coupled to, such as in signal communication with, timing controller 206, e.g., coupled to an outer surface of electrowetting display 204 or embedded in electrowetting display device 200 external to electrowetting display 204, and configured to detect and/or measure an ambient light condition value. In this embodiment, light sensor 214 measures the ambient light condition value and transmits a corresponding signal indicative of the measured ambient light condition value to timing controller 206 for use by timing controller 206 in adjusting one or more values for one or more device parameters of one or more components of electrowetting display device 200, as described in greater detail below.

Alternatively or in addition to light sensor 214, timing controller 206 may include a brightness sensor 216 configured to detect and/or measure a brightness histogram condition of one or more, e.g., all, pixel regions in an image content. Brightness sensor 216 transmits a corresponding signal, which may include histogram data and/or other data, to timing controller 206 indicative of the detected brightness condition for use by timing controller 206 to adjust one or more values for one or more device parameters of one or more components of electrowetting display device 200. Brightness sensor 206 may include any suitable sensor and/or component to detect and/or measure brightness conditions of an image content and transmit data signals to timing controller 206. In another embodiment, electrowetting display device 200 includes one or more temperature sensors 218 configured to detect and/or measure a temperature condition of electrowetting display device 200, e.g., a temperature condition within a selected area or region of electrowetting display device 200 such as at or near one or more display drivers. For example, in a particular embodiment, one or more temperature sensors 218 are positioned at or near column driver 212 and/or at or near row driver 210 to measure a system temperature condition of electrowetting display 204 during use of electrowetting display device 200. Temperature sensor 218 transmits a corresponding signal to timing controller 206 indicative of the detected temperature condition for use by timing controller 206 to adjust one or more values for one or more device parameters of one or more components of electrowetting display device 200. In certain embodiments, timing controller 206 is also configured to determine whether the image displayed on electrowetting display panel 208 is still, i.e., whether the displayed image is a moving image or a still image.

An illumination device, e.g., a backlight 220 is coupled to electrowetting display device 200 and configured to illuminate at least a portion of electrowetting display panel 208 and the pixel regions therein. When activated, backlight 220 causes light to pass through the open pixels of electrowetting display panel 208 to a viewer. Conversely, if electrowetting display panel 208 is implemented as an array of reflective pixels, the illumination device may be implemented as a front light. In which case, when activated, the illumination device causes light to strike the viewing surface of the display panel and be reflected back out of open pixels to a viewer. Backlight 220 may be implemented using any appropriate light generating devices, such as a light emitting diode (LED) or an array of LEDs. When implemented as backlight 220, the illumination device may include any suitable number of different light sources distributed over a back surface of electrowetting display panel 208. Alternatively, backlight 220 may include one or more light bulbs, such as one or more halogen light bulbs.

Backlight 220 is coupled to timing controller 206 enabling timing controller 206 to control an output of backlight 220 and, specifically, a magnitude of light generated by backlight 220. In specific embodiments, for example, backlight 220 is driven by a pulse-width modulated (PWM) power supply. In that case, timing controller 206 may control the output of backlight 220 by adjusting or controlling the duty cycle of the PWM power supply that powers backlight 220. Generally, timing controller 206 is configured to modify the output of backlight 220 at a relatively high frequency, such as by being able to change the output of backlight 220 every 1/60 of a second. As such, timing controller 206 may adjust the output of backlight 220 at a rate about equal to the address period of electrowetting display device 200. Timing controller 206 can adjust or change the output of backlight 220 each time timing controller 206 may also change the driving voltage values being supplied to pixel regions 112 of electrowetting display device 200. As electrowetting display device 200 operates, therefore, timing controller 206 can adjust the output of backlight 220 to compensate for reductions in pixel luminance resulting from a reduced voltage value applied by column driver 212 to one or more pixel regions 112, as described herein, backflow, capacitor leakage, and/or reset pulses. As the luminance of pixel regions 112 of electrowetting display device 200 diminish, timing controller 206 can increase the output of backlight 220 so that the brightness of electrowetting display device 200 appears to stay constant.

In one embodiment, timing controller 206 includes a frame memory 221 to store a frame of image data received from a host system, e.g., external image source 202, such as a display, an operating system, a video, or a channel, for example. In one embodiment, frame memory 221 is embedded in timing controller 206. In various embodiments, frame memory 221 allows timing controller 206 to control the address timing for electrowetting display panel 208 independent from the address timing of image source 202 by using frame memory 221 such that image source 202 requires no activity and can thus enter a power saving "sleep" mode while electrowetting display panel 208 still displays an image. When image source 202 sends image data for a still image (or slow moving image) to timing controller 206, which can store the image data in memory, e.g., frame memory 221, image source 202 no longer needs to send the image data to timing controller 206 because timing controller 206 has stored the image data in frame memory 221.

Timing controller 206 can thus instruct image source 202 to go into a low power or "sleep" mode, thereby saving system power, until a new or faster moving image is to be provided to electrowetting display 204. When needed, timing controller 206 can repeat sending the image data from frame memory 221 to electrowetting display panel 208 to thereby refresh the image. Hence, image source 202 need not be aware of any specific property of electrowetting display 204 (e.g., an image repeat rate).

Referring further to FIGS. 1-4, in an example embodiment, timing controller 206 is configured to adjust one or more device parameters based at least in part on a measured operating condition value for a first performance property electrowetting display device 200. As described above, one or more sensors, e.g., light sensor 214, brightness sensor 216, and/or temperature sensor 218, are coupled to timing controller 206. Each sensor is configured to measure one or more operating conditions for electrowetting display device 200, e.g., an ambient light, a brightness condition of each pixel region in an image content, a system temperature or a temperature condition of electrowetting display device 200, and/or whether the image displayed on electrowetting display 204 is still or moving.

For example, in an example embodiment, a display device, e.g., electrowetting display device 200 includes a plurality of pixel regions 112 positioned between first or bottom support plate 124 and second or top support plate 134 and arranged in a plurality of rows and a plurality of columns. In this embodiment, timing controller 206 is configured to determine that a measured operating condition value for a first performance property of the display device is outside an operating range for the first performance property. A first value for a first device parameter is adjusted by timing controller 206 to an adjusted first value based on the measured operating condition value and a second value for a second device parameter is adjusted by timing controller 206 to an adjusted second value based on the measured operating condition value.

In a particular embodiment, timing controller 206 is configured to generate an adjusted operating condition value, $\alpha$, within an adjusted operating range for the first performance property. The adjusted operating range is between an adjusted low threshold value and an adjusted high threshold value. The timing controller sets an adjusted first value for the first device parameter based on the adjusted operating condition value and sets an adjusted second value for the second device parameter based on the adjusted operating condition value. In this particular embodiment, the adjusted first value is set by multiplying the first value by $\alpha$ and the adjusted second value is set by multiplying the second value by $(1-\alpha)$. In certain embodiments, when $\alpha$=o, timing controller 206 controls the performance of electrowetting display device 200 based only on the second device parameter and when $\alpha=1$, timing controller 206 controls the performance of electrowetting display device 200 based only on the first device parameter. When $\alpha$ is between '0' and '1', timing controller 206 controls the performance of electrowetting display device 200 based on a combination of the adjusted first value for the first device parameter and the adjusted second value for the second device parameter.

In example embodiments, a sensor is coupled to timing controller 206. The sensor is configured to detect and/or measure an operating condition to determine the measured operating condition value for the first performance property. Timing controller 206 is configured to cause, based on the measured operating condition value, column driver 106 to apply an adjusted voltage value to each pixel region 112 at the adjusted first value. In a particular embodiment, timing controller 206 is configured to cause, based on the measured operating condition value, an increased voltage value to the backlight at the adjusted second value, wherein the adjusted second value determines a lumen output of the backlight.

Figure 5:
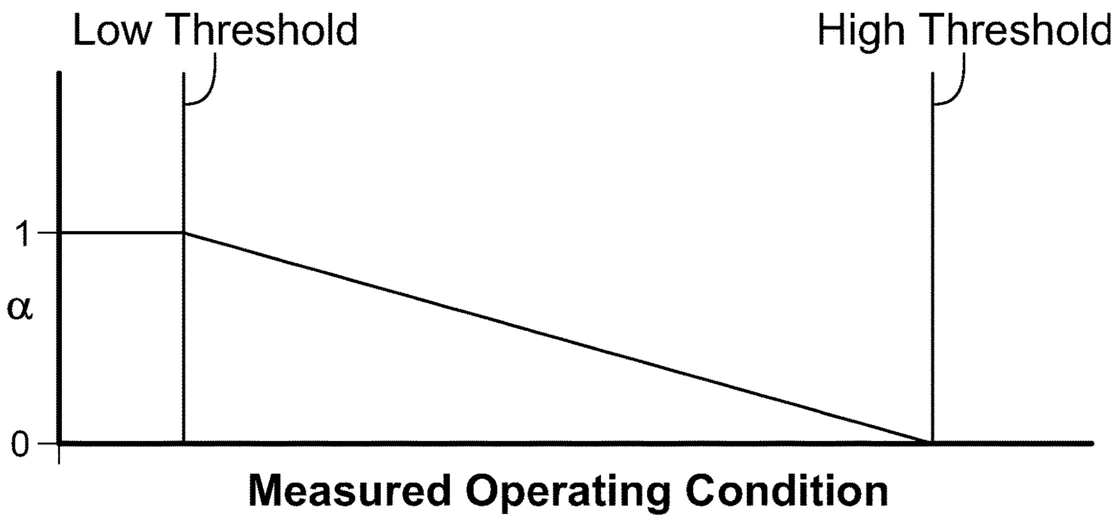
FIG. 5 is a graph of a measured condition of an example electrowetting display device within an operating range, according to various embodiments.

Referring additionally to FIG. 5, upon receiving one or more signals from the one or more sensors corresponding to the detected operation conditions for electrowetting display device 200, timing controller 206 is configured to determine that a measured operating condition value for a first performance property of the display device is outside an operating range for the first performance property and generate an adjusted operating condition value, $\alpha$, within an adjusted operating range for the first performance property based on the measured operating condition value. In this embodiment, the adjusted operating range for the measured operating condition value is between an adjusted low threshold value, as shown in FIG. 5, where $\alpha=1$ and an adjusted high threshold value, as shown in FIG. 5, where $\alpha=0$. In one embodiment, timing controller 206 is configured to compare the adjusted operating condition value $\alpha$ to the adjusted low threshold value and the adjusted high threshold value for the measured operating condition shown in FIG. 5 to determine that the adjusted operating condition value $\alpha$ is within the adjusted operating range for the measured operating condition value. In certain embodiments, if the measured operating condition value is less than the adjusted low threshold value, the adjusted operating condition value is converted to $\alpha=1$, and, conversely, if the measured operating condition value is greater than the adjusted high threshold value, the adjusted operating condition value is converted to $\alpha=0$.

With the adjusted operating condition value $\alpha$ within the adjusted operating range for the measured operating condition value, timing controller 206 then adjusts a first value for a first device parameter of electrowetting display device 200, e.g., a brightness of a white sub-pixel, an adjusted voltage value to column driver 106, or an addressing rate of electrowetting display 204, to an adjusted first value based on the measured operating condition value. Similarly, timing controller 206 adjusts a second value for a second device parameter of electrowetting display device 200, e.g., an adjusted voltage value to backlight 220 to adjust a lumen output of backlight 220, to an adjusted second value based on the measured operating condition value.

In the example embodiment, the adjusted first value for the first device parameter and the adjusted second value for the second device parameter are set based on the adjusted operating condition value $\alpha$. In a particular embodiment, the adjusted first value for the first device parameter of electrowetting display device 200 is set by multiplying the first value by $\alpha$, and the adjusted second value for the second device parameter of electrowetting display device 200 is set by multiplying the second value by $(1\alpha)$.

Timing controller 206 is then configured to apply the adjusted first value and the adjusted second value to adjust performance properties of electrowetting display device 200, e.g., color saturation, power consumption, brightness, or visual line-crawl, to maintain or enhance the performance of electrowetting display device 200. In a particular embodiment, timing controller 206 is configured to identify a second performance property of electrowetting display device 200 for adjusting to enhance the performance of electrowetting display device 200 and identify, based at least in part on the identification of the second performance property, the first performance property of electrowetting display device 200 for adjusting in order to allow for adjustment of the second performance property.

For example, in one embodiment, light sensor 214 for measuring an ambient light condition is coupled to a controller, e.g., timing controller 206 that controls the plurality of pixel region electrodes. Timing controller 206 is configured to determine that an ambient light condition value for the ambient light condition measured by light sensor 214 is above an operating threshold value for an ambient light operating condition. Timing controller 206, based on the ambient light condition value, causes column driver 212 to apply a reduced voltage value to each pixel region 112 at the adjusted first value for the first device parameter and causes an increased voltage value to be applied to backlight 220 at the adjusted second value for the second device parameter. The adjusted second value determines a lumen output of backlight 220. For example, timing controller 206 compares the ambient light condition to an ambient light operating threshold to determine an adjusted operating condition value and determines an initial voltage value applied to each pixel region 112. In this embodiment, timing controller 206 generates an adjusted operating condition value, α, based on the ambient light condition measured by light sensor 214. The adjusted operating condition value, α, is within an adjusted operating range for the ambient light operating condition between an adjusted low threshold value and an adjusted high threshold value. The adjusted first value for the first device parameter is set by timing controller 206 for the reduced voltage value based on the adjusted operating condition value. The adjusted second value for the second device parameter is set by timing controller 206 for backlight 220 based on the adjusted operating condition value. In this embodiment, the adjusted first value is set by multiplying the first value by α and the adjusted second value is set by multiplying the second value by (1−α).

In an alternative embodiment, temperature sensor 218 for measuring a temperature condition of electrowetting display device 200 is coupled to a controller, e.g., timing controller 206. Timing controller 206 is configured to determine that a temperature condition value for the temperature condition measured by temperature sensor 218 is above an operating threshold value for a temperature operating condition. Timing controller 206, based on the temperature condition value, causes column driver 212 to apply a reduced voltage value to each pixel region 112 at the adjusted first value for the first device parameter and causes an increased voltage value to be applied to backlight 220 at the adjusted second value for the second device parameter. The adjusted second value determines a lumen output of backlight 220. Timing controller 206 generates an adjusted operating condition value, α, based on the temperature condition measured by the temperature sensor. The adjusted operating condition value, α, is within an adjusted operating range for the temperature condition between an adjusted low threshold value and an adjusted high threshold value. The adjusted first value for the first device parameter is set by timing controller 206 for the reduced voltage value based on the adjusted operating condition value. The adjusted second value for the second device parameter is set by timing controller 206 for backlight 220 based on the adjusted operating condition value. In this embodiment, the adjusted first value is set by multiplying the first value by α and the adjusted second value is set by multiplying the second value by (1−α).

In a further alternative embodiment, brightness sensor 216 for measuring a brightness condition of each pixel region in an image content is coupled to a controller, e.g., timing controller 206. Timing controller 206 includes a frame memory to store one or more frames of image data including a plurality of pixel data. Each pixel data of the plurality of pixel data corresponds to a respective pixel region of the plurality of pixel regions. Timing controller 206 compares a brightness condition value for each pixel data to an operating threshold value for the brightness condition measured by brightness sensor 216. Timing controller 206 is configured to determine that a percentage of the plurality of pixel data does not exceed the operating threshold value for the brightness condition measured by brightness sensor 216. Timing controller 206, based on the brightness condition value, causes column driver 212 to apply a reduced voltage value to each pixel region at the adjusted first value for the first device parameter and causes an increased voltage value to be applied to backlight 220 at the adjusted second value for the second device parameter. In this embodiment, the adjusted second value determines a lumen output of backlight 220. Timing controller 206 generates an adjusted operating condition value, α, based on the brightness condition measured by brightness sensor 216. The adjusted operating condition value, α, is within an adjusted operating range for the brightness condition between an adjusted low threshold value and an adjusted high threshold value. Timing controller 206 sets the adjusted first value for the first device parameter for the reduced voltage based on the adjusted operating condition value. Timing controller 206 sets the adjusted second value for the second device parameter for backlight 220 based on the adjusted operating condition value. In this embodiment, the adjusted first value is set by multiplying the first value for the first device parameter by α and the adjusted second value is set by multiplying the second value for the second device parameter by (1−α).

In general, reduction of power will reduce image quality, except in specific circumstances. For electrowetting displays, power consumption by the drivers is relatively high when compared to LCD displays; hence, the benefit for reducing power consumption is more relevant. For frontlight or backlight applications, the power consumption of electrowetting displays is relative low compared to LCD displays; hence, the benefit for reducing power consumption is less relevant. These considerations lead to different optimal system solutions.

In order to achieve the specified amount of brightness on the electrowetting display, typically the color saturation is compromised, e.g., by adding a white sub-pixel or using more transparent color filters. The related display brightness largely depends on the ambient lighting conditions. In bright ambient conditions, in certain embodiments, contrast can be exchanged for color saturation, while maintaining sufficient brightness. As a result, the color saturation of the electrowetting display device is increased in bright ambient conditions while maintaining a sufficient brightness level.

During certain applications, the display drivers consume a significant amount of energy in order to achieve a specified contrast on the electrowetting display. The related display brightness largely depends on a combination of this contrast and the ambient lighting conditions. In bright ambient conditions, in certain embodiments, contrast can be exchanged for reduced power consumption, while maintaining a sufficient brightness level. By reducing the driving voltage, e.g., the voltage values applied by column driver 212 to pixel regions 112, the power consumption may be reduced quadratically to the driving voltage. As a result, the power consumption of the electrowetting display device is reduced, by reducing a drive voltage, and contrast is reduced in bright ambient conditions while maintaining a sufficient brightness level.

As described above, during certain applications, the display drivers consume a significant amount of energy in order to achieve a specified contrast on the electrowetting display. Yet image content does not always address the full contrast and brightness range. By adaptively limiting the driving voltage to a level which is actually required by the image content and compensating this action with video gain, power can be saved in the output stage of the source drivers. As a result, the power consumption of the electrowetting display drivers is reduced by reducing the drive voltage depending on the contrast and brightness of the image content, while maintaining color resolution.

In certain applications, the contrast of an electrowetting display device depends on a temperature of the display panel. Rather than varying the contrast with the operating temperature, the electrowetting display contrast can be temperature-stabilized by making the temperature adaptive to ambient temperature conditions. For example, the temperature dependent electrowetting display device contrast variations can be stabilized by adjusting the driving voltage of the display panel, depending of the panel temperature.

The display driver consumes a significant amount of energy in order to achieve the specified contrast on the electrowetting display. The maximum contrast is typically limited by the worst case temperature of the display drivers and depends on the image-rate and refresh-rate (switching frequency), the image content (switching frequency), the driving voltage (quadratic relation towards power consumption) and ambient temperature. Rather than limiting the electrowetting display contrast to a pre-defined operating condition, the contrast can be made adaptive to the actual temperature of the display driver. For example, the electrowetting display contrast can be increased to a maximum limit by temporarily increasing the driving voltage of the display panel depending on the temperature of the display drivers and as limited by the maximum operating temperature.

As the display driver consumes significantly more energy than a front-light, power can be conserved by exchanging driver power with front-light power while maintaining brightness. The power saved in this way is exchanged for contrast in certain embodiments. As a result, the power consumption of a front-lit electrowetting display device can be reduced by reducing a driving voltage and at the same time increasing front-light brightness to maintain a desired brightness.

As described herein, the image quality, as well as power constraints, are conditional and adaptive to the application, ambient conditions and image content conditions. In certain embodiments, these properties can be balanced and controlled on a continuous basis.

Table 1 below shows various first performance properties that can be adjusted in various measured operating conditions for electrowetting display device 200 in order to adjust one or more second performance properties to maintain, enhance or optimize the performance of electrowetting display device 200.

TABLE 1

| Desired Second Performance Property | Measured Operating Condition Value | Adjusted First Performance Property |
|---|---|---|
| Increase color saturation | (High) ambient brightness | Reduce brightness of white sub-pixels |
| Decrease power consumption | (High) ambient brightness | Reduce driving voltage of EWD panel |
| Increase color saturation & decrease power consumption | (High) ambient brightness | Reduce driving voltage of EWD panel, inducing extra color saturation when applied to in-cell white EWD panel |
| Optimal grey tone distribution | (High) ambient brightness | Adjust Gamma settings, reciprocal to ambient brightness |
| Decrease power consumption | (Bright) Sub-pixel image histogram output signal | Reduce driving voltage of EWD panel |
| Decrease power consumption | (Bright) Sub-pixel image histogram output signal | Reduce driving voltage of EWD panel, while increasing front-light brightness |
| Increase brightness | (High) system temperature | Increase driving voltage of EWD panel, limited by temperature feedback |
| Decrease power consumption | Still image displayed | Reduce address rate of EWD panel |
| Avoid visual line-crawl | (High) ambient brightness | Increase the (power) reduced address rate of EWD panel |

Figure 6A:
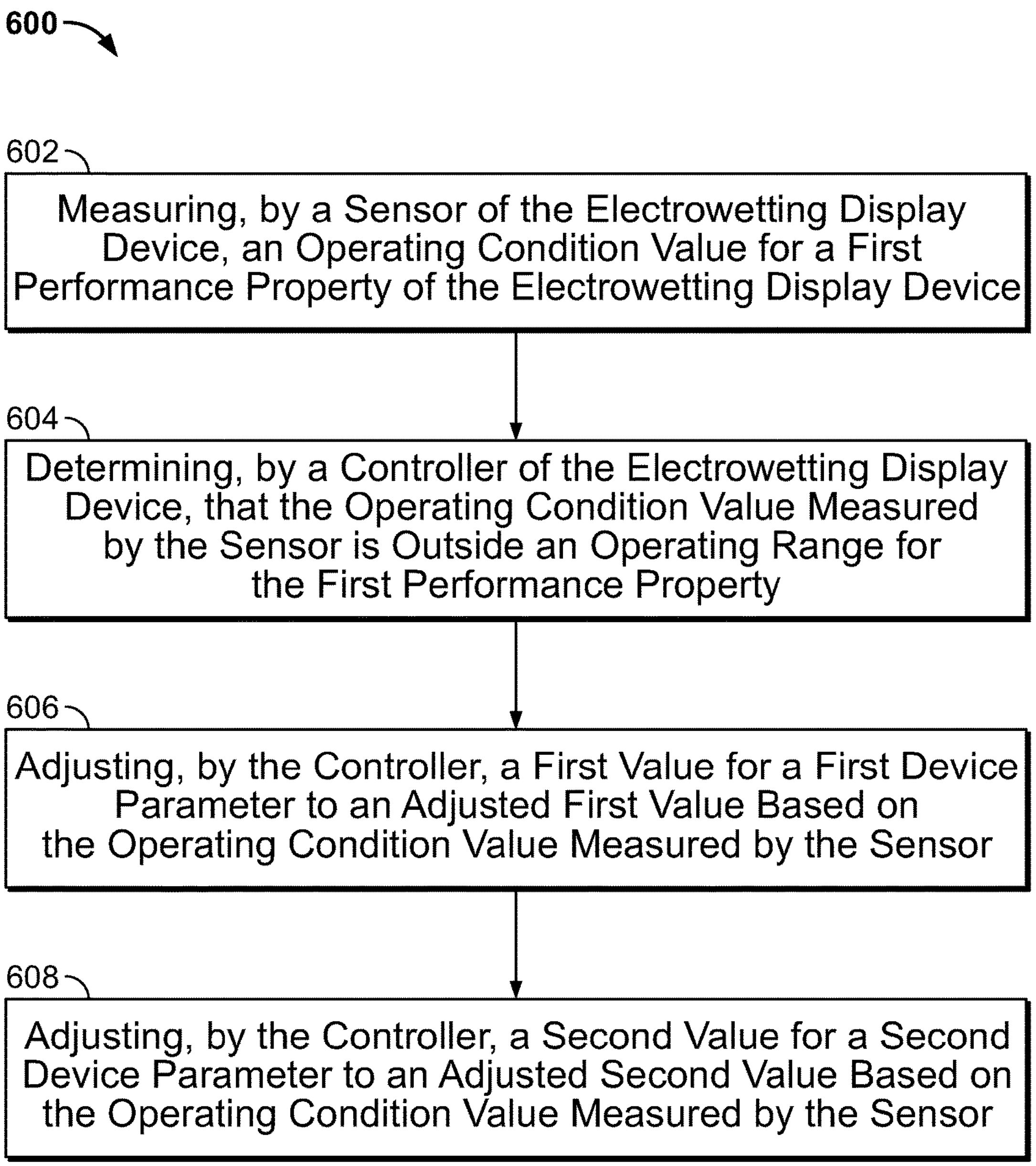
FIGS. 6A and 6B are flowcharts depicting example methods implemented by a timing controller for adjusting performance properties of an example electrowetting display device.

FIG. 6A is a flowchart depicting a method 600 implemented by a controller, such as timing controller 206, for adjusting performance properties of a display device, such as an electrowetting display device, for example, an electrowetting display device as shown in FIGS. 1-3, to enhance the performance of the electrowetting device. In the example embodiment shown in FIG. 6A, an operating condition value for a first performance property of the electrowetting display device is measured 602 by a sensor coupled to the timing controller. In a particular embodiment, the electrowetting display device includes one or more sensors, e.g., one or more light sensors, one or more brightness sensors, and/or one or more temperature sensors, coupled to the timing controller and configured to detect and/or measure one or more operating condition values for one or more performance properties of the electrowetting display device.

For example, in certain embodiments, measuring, by a sensor, an operating condition value for a first performance value of an electrowetting display device includes measuring with a light sensor an ambient light condition of the display, measuring with a brightness sensor a brightness condition of each pixel region of the plurality of pixel regions in an image content, measuring with a temperature sensor a temperature condition of the display device, e.g., a temperature of the column driver for the electrowetting display device, and/or determining that the image is still. In particular embodiments, one or more sensors coupled to the timing controller are configured to measure one or more operating condition values for one or more performance properties of the electrowetting display device and transmit corresponding signals to the timing controller indicative of the measured operating condition values for processing by the timing controller. Based on the measured operating condition value for the first performance property of the electrowetting display device, the timing controller determines 604 that the operating condition value measured by the sensor is outside an operating range for the first performance property. A first value for a first device parameter of the electrowetting display device is adjusted 606 by the timing controller to an adjusted first value based on the operating condition value measured by the sensor. A second value for a second device parameter is adjusted 608 by the timing controller to an adjusted second value based on the operating condition value measured by the sensor.

Figure 6B:
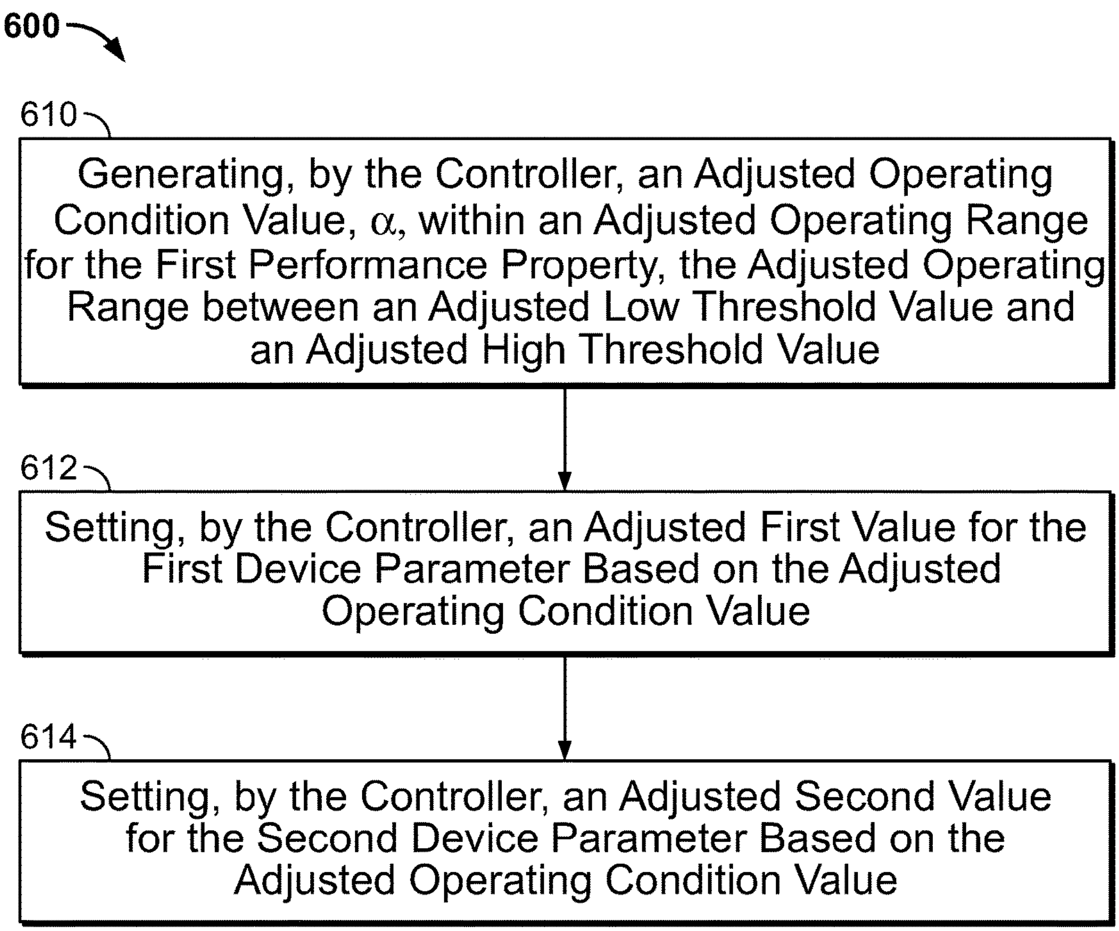

In a particular embodiment as shown in FIG. 6B, the timing controller generates 610 an adjusted operating condition value, $\alpha$, for the measured operating condition value. The adjusted operating condition value, $\alpha$, is within an adjusted operating range for the first performance property. In the example embodiment, the adjusted operating range is between an adjusted low threshold value where $\alpha=1$ and an adjusted high threshold value where $\alpha=0$.

With the adjusted operating condition value, $\alpha$, within the adjusted operating range, a first value for a first device parameter of the electrowetting display device is set 612 by the timing controller based on the adjusted operating condition value, $\alpha$. A second value for a second device parameter of the electrowetting display device is also set 614 by the timing controller based on the adjusted operating condition value. In one embodiment, the first value for the first device parameter of the electrowetting display device is set by multiplying the first value by $\alpha$ to provide the set first value for the first device parameter, and the second value for the second device parameter of the electrowetting display device is set by multiplying the first value by $(1-\alpha)$ to provide the set second value for the second device parameter.

In a particular embodiment, the timing controller then adjusts one or more performance properties of the electrowetting display device based on the adjusted first value for the first device parameter and the adjusted second value for the second device parameter to adjust performance properties of the electrowetting display device to enhance or maintain the performance of the electrowetting display device at a desired level.

In certain embodiments, the timing controller identifies the second performance property of the electrowetting display device to adjust, e.g., enhance or optimize, in order to enhance the performance of the electrowetting display device and identifies the first performance property of the electrowetting display device that is adjusted to allow the enhancement of the second performance property.

In one embodiment, the sensor is a light sensor for measuring an ambient light condition. The controller determines that an ambient light condition value for the ambient light condition measured by the light sensor is above an operating threshold value for an ambient light operating condition. The controller causes, based on the ambient light condition value, a column driver coupled to the controller to apply a reduced voltage value to each pixel region of a plurality of pixel regions at the adjusted first value and apply an increased voltage value to a backlight coupled to the controller at the adjusted second value, wherein the adjusted second value determines a lumen output of the backlight.

In one embodiment, the sensor is a temperature sensor for measuring a temperature condition of the display device. The controller determines that a temperature condition value for the temperature condition measured by the temperature sensor is above an operating threshold value for a temperature operating condition. The controller causes, based on the temperature condition value, a column driver coupled to the controller to apply a reduced voltage value to each pixel region of a plurality of pixel regions at the adjusted first value and apply an increased voltage value to a backlight coupled to the controller at the adjusted second value, wherein the adjusted second value determines a lumen output of the backlight.

In one embodiment, the controller is configured to control a state of a plurality of pixel regions of the electrowetting display device. The controller includes a frame memory storing image data including a plurality of pixel data. Each pixel data of the plurality of pixel data corresponds to a respective pixel region of a plurality of pixel regions. In this embodiment, the sensor is a brightness sensor for measuring a brightness condition of each pixel region of the plurality of pixel regions in an image content. The controller compares a brightness condition value for each pixel data to an operating threshold value for the brightness condition measured by the brightness sensor. The controller determines that a percentage of the plurality of pixel data does not exceed the operating threshold value for the brightness condition measured by the brightness sensor. The controller causes, based on the brightness condition value, a column driver coupled to the controller to apply a reduced voltage value to each pixel region at the adjusted first value and apply an increased voltage value to a backlight coupled to the controller at the adjusted second value, wherein the adjusted second value determines a lumen output of the backlight.

Figure 7:
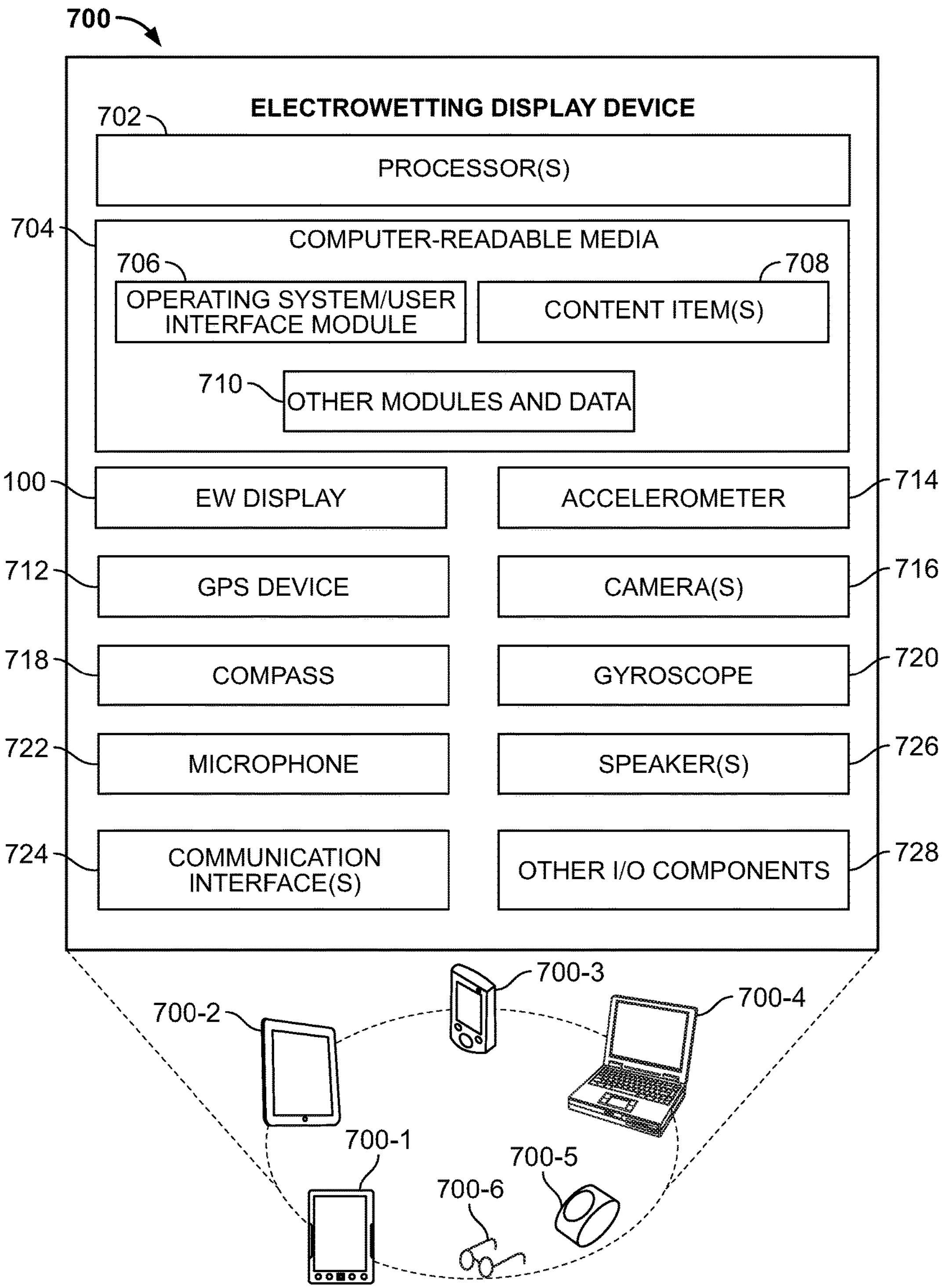
FIG. 7 illustrates example electrowetting display devices that may incorporate an electrowetting display, according to various embodiments.

FIG. 7 illustrates select example components of an example electronic device, e.g., an electrowetting display device 700, according to some implementations. In alternative embodiments, the electronic device may include other suitable displays. Such types of displays include, but are not limited to, LCDs, cholesteric displays, electrophoretic displays, electrofluidic pixel displays, photonic ink displays, and the like.

Electrowetting display device 700 may be implemented as any of a number of different types of electronic devices. Some examples of electrowetting display device 700 may include digital media devices and eBook readers 700-1; tablet computing devices 700-2; smart phones, mobile devices and portable gaming systems 700-3; laptop and netbook computing devices 700-4; wearable computing devices 700-5; augmented reality devices, helmets, goggles or glasses 700-6; and any other device capable of connecting with electrowetting display device 100 and including a processor and memory for controlling the display according to the techniques described herein.

In a very basic configuration, electrowetting display device 700 includes, or accesses, components such as at least one control logic circuit, central processing unit, or processor 702, and one or more computer-readable media 704. Each processor 702 may itself include one or more processors or processing cores. For example, processor 702 can be implemented as one or more microprocessors, microcomputers, microcontrollers, digital signal processors, central processing units, state machines, logic circuitries, and/or any devices that manipulate signals based on operational instructions. In some cases, processor 702 may be one or more hardware processors and/or logic circuits of any suitable type specifically programmed or configured to execute the algorithms and processes described herein. Processor 702 can be configured to fetch and execute computer-readable instructions stored in computer-readable media 704 or other computer-readable media. Processor 702 can perform one or more of the functions attributed to timing controller 102, gate driver 104, and/or source driver 106 of electrowetting display device 100. Processor 702 can also perform one or more functions attributed to a graphic controller (not shown in FIG. 7) for the electrowetting display device.

Depending on the configuration of electrowetting display device 700, computer-readable media 704 may be an example of tangible non-transitory computer storage media and may include volatile and nonvolatile memory and/or removable and non-removable media implemented in any type of technology for storage of information such as computer-readable instructions, data structures, program modules or other data. Computer-readable media 704 may include, without limitation, RAM, ROM, EEPROM, flash memory or other computer readable media technology, CD-ROM, digital versatile disks (DVD) or other optical storage, magnetic cassettes, magnetic tape, solid-state storage and/or magnetic disk storage. Further, in some embodiments, electrowetting display device 700 may access external storage, such as RAID storage systems, storage arrays, network attached storage, storage area networks, cloud storage, or any other medium that can be used to store information and that can be accessed by processor 702 directly or through another computing device or network. Accordingly, computer-readable media 704 may be computer storage media able to store instructions, modules or components that may be executed by processor 702.

Computer-readable media 704 may be used to store and maintain any number of functional components that are executable by processor 702. In some implementations, these functional components comprise instructions or programs that are executable by processor 702 and that, when executed, implement operational logic for performing the actions attributed above to electrowetting display device 700. Functional components of electrowetting display device 700 stored in computer-readable media 704 may include the operating system and user interface module 706 for controlling and managing various functions of electrowetting display device 700, and for generating one or more user interfaces on electrowetting display device 100 of electrowetting display device 700.

In addition, computer-readable media 704 may also store data, data structures and the like, that are used by the functional components. For example, data stored by computer-readable media 704 may include user information and, optionally, one or more content items 708. Depending on the type of electrowetting display device 700, computer-readable media 704 may also optionally include other functional components and data, such as other modules and data 710, which may include programs, drivers and so forth, and the data used by the functional components. Further, electrowetting display device 700 may include many other logical, programmatic and physical components, of which those described are merely examples that are related to the discussion herein. Further, while the figures illustrate the functional components and data of electrowetting display device 700 as being present on electrowetting display device 700 and executed by processor 702 on electrowetting display device 700, it is to be appreciated that these components and/or data may be distributed across different computing devices and locations in any manner.

FIG. 7 further illustrates examples of other components that may be included in electrowetting display device 700. Such examples include various types of sensors, which may include a GPS device 712, an accelerometer 714, one or more cameras 716, a compass 718, a gyroscope 720, and/or a microphone 722. Electrowetting display device 700 may further include one or more communication interfaces 724, which may support both wired and wireless connection to various networks, such as cellular networks, radio, Wi-Fi networks, close-range wireless connections, near-field connections, infrared signals, local area networks, wide area networks, the Internet, and so forth. Communication interfaces 724 may further allow a user to access storage on or through another device, such as a remote computing device, a network attached storage device, cloud storage, or the like.

Electrowetting display device 700 may further be equipped with one or more speakers 726 and various other input/output (I/O) components 728. Such I/O components 728 may include a touchscreen and various user controls (e.g., buttons, a joystick, a keyboard, a keypad, etc.), a haptic or tactile output device, connection ports, physical condition sensors, and so forth. For example, operating system 706 of electrowetting display device 700 may include suitable drivers configured to accept input from a keypad, keyboard, or other user controls and devices included as I/O components 728. Additionally, electrowetting display device 700 may include various other components that are not shown, examples of which include removable storage, a power source, such as a battery and power control unit, a PC Card component, and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. An electrowetting display device, comprising:

a first support plate and a second support plate opposite the first support plate;

a plurality of pixel regions positioned between the first support plate and the second support plate and arranged in a plurality of rows and a plurality of columns;

an oil disposed between the first support plate and the second support plate in each pixel region of the plurality of pixel regions;

an electrolyte fluid immiscible with the oil, the electrolyte fluid disposed between the first support plate and the second support plate in each pixel region;

an electrode layer comprising a plurality of pixel region electrodes, each pixel region electrode of the plurality of pixel region electrodes for applying, in conjunction with a common electrode, a voltage to a respective pixel region of the plurality of pixel regions to cause displacement of the oil in the respective pixel region;

a light sensor configured to measure an ambient light condition; and a timing controller to control the plurality of pixel region electrodes, wherein the timing controller is configured to:

comparing the ambient light condition to an ambient light operating threshold to determine the ambient light condition is outside of an operating range;

generate an adjusted operating condition value, α, within an adjusted operating range for the ambient light condition, the adjusted operating range between an adjusted low threshold value and an adjusted high threshold value;

determine an initial voltage value applied to each pixel region;

cause, based on the adjusted operating condition value, α, a column driver to apply reduced voltage values to each pixel region by multiplying the initial voltage value by the adjusted operating condition value, α;

determine an initial voltage value applied to a backlight; and apply, based on the adjusted operating condition value, an adjusted voltage value to the backlight by multiplying the initial voltage value applied to the backlight by (1−α), wherein the adjusted voltage value determines a lumen output of the backlight.

2. The electrowetting display device of claim 1, further comprising the backlight coupled to the timing controller.

3. A display device, comprising:

a first support plate and a second support plate opposite the first support plate;

a plurality of pixel regions positioned between the first support plate and the second support plate and arranged in a plurality of rows and a plurality of columns; and a controller configured to:

determine that a measured operating condition value for a first performance property of the display device is outside an operating range for the first performance property, the first measure operating condition value comprising at least one of an ambient light condition value, a temperature condition value, or a brightness condition value;

generate an adjusted operating condition value, α, within an adjusted operating range for the first performance property, the adjusted operating range between an adjusted low threshold value and an adjusted high threshold value;

adjust a first value for a first device parameter to an adjusted first value by multiplying the first value by α, the first device parameter comprising a voltage value of at least one pixel region; and adjust a second value for a second device parameter to an adjusted second value by multiplying the second value by (1−α), the second device parameter comprising a lumen output of a backlight.

4. The display device of claim 3, further comprising:

a sensor coupled to the controller, the sensor configured to measure an operating condition to determine the measured operating condition value for the first performance property;

a backlight coupled to the controller; and a column driver coupled to the controller, the column driver configured to apply voltage values to each pixel region of the plurality of pixel regions, wherein the controller is configured to cause the column driver to apply an adjusted voltage value to each pixel region at the adjusted first value.

5. The display device of claim 4, wherein the sensor comprises a light sensor for measuring an ambient light condition; and the controller is further configured to:

determine that the ambient light condition value for the ambient light condition measured by the light sensor is above an operating threshold value for an ambient light operating condition; and cause, based on the ambient light condition value, the column driver to apply a reduced voltage value to each pixel region at the adjusted first value and apply an increased voltage value to the backlight at the adjusted second value, wherein the adjusted second value determines the lumen output of the backlight.

6. The display device of claim 5, wherein the controller is further configured to:

generate the adjusted operating condition value, α, based on the ambient light condition measured by the light sensor, the adjusted operating condition value, α, within an adjusted operating range for the ambient light operating condition, the adjusted operating range between an adjusted low threshold value and an adjusted high threshold value;

set the adjusted first value for the reduced voltage value by multiplying the first value by α; and set the adjusted second value for the backlight by multiplying the second value by (1−α).

7. The display device of claim 4, wherein the sensor comprises a temperature sensor, the temperature sensor for measuring a temperature condition of the display device; and the controller is further configured to:

determine that the temperature condition value for the temperature condition measured by the temperature sensor is above an operating threshold value for a temperature operating condition; and cause, based on the temperature condition value, the column driver to apply a reduced voltage value to each pixel region at the adjusted first value and apply an increased voltage value to the backlight at the adjusted second value, wherein the adjusted second value determines the lumen output of the backlight.

8. The display device of claim 7, wherein the controller is further configured to:

generate the adjusted operating condition value, α, based on the temperature condition measured by the temperature sensor, the adjusted operating condition value, α, within an adjusted operating range for the temperature condition, the adjusted operating range between an adjusted low threshold value and an adjusted high threshold value;

set the adjusted first value for the reduced voltage value by multiplying the first value by α; and set the adjusted second value for the backlight by multiplying the second value by (1−α).

9. The display device of claim 4, wherein the sensor comprises a brightness sensor for measuring a brightness condition of each pixel region in an image content; and the controller comprises a frame memory storing image data including a plurality of pixel data, each pixel data of the plurality of pixel data corresponding to a respective pixel region of the plurality of pixel regions, and the controller is configured to:

compare the brightness condition value for each pixel data to an operating threshold value for the brightness condition measured by the brightness sensor;

determine that a percentage of the plurality of pixel data does not exceed the operating threshold value for the brightness condition measured by the brightness sensor; and cause, based on the brightness condition value, the column driver to apply a reduced voltage value to each pixel region at the adjusted first value and apply an increased voltage value to the backlight at the adjusted second value, wherein the adjusted second value determines a lumen output of the backlight.

10. The display device of claim 9, wherein the controller is further configured to:

generate the adjusted operating condition value, α, based on the brightness condition measured by the brightness sensor, the adjusted operating condition value, α, within an adjusted operating range for the brightness condition, the adjusted operating range between an adjusted low threshold value and an adjusted high threshold value;

set an adjusted first value for the reduced voltage by multiplying the first value by α; and set an adjusted second value for the backlight by multiplying the second value by (1−α).

11. A method for adjusting performance properties of an electrowetting display device, the method comprising:

measuring, by a sensor of the electrowetting display device, an operating condition value for a first performance property of the electrowetting display device;

determining, by a controller of the electrowetting display device, that the operating condition value measured by the sensor is outside an operating range for the first performance property;

generating, by the controller, an adjusted operating condition value, α, within an adjusted operating range for the first performance property, the adjusted operating range between an adjusted low threshold value and an adjusted high threshold value;

adjusting, by the controller, a first value for a first device parameter to an adjusted first value based on the adjusted operating condition value; and adjusting, by the controller, a second value for a second device parameter to an adjusted second value by multiplying the second value by (1−α) to provide the adjusted second value.

12. The method of claim 11, wherein setting, by the controller, an adjusted first value for the first device parameter based on the adjusted operating condition value comprises multiplying the first value by α to provide the adjusted first value.

13. The method of claim 11, wherein the sensor comprises a light sensor for measuring an ambient light condition, the method further comprising:

determining, by the controller, that an ambient light condition value for the ambient light condition measured by the light sensor is above an operating threshold value for an ambient light operating condition; and causing, by the controller, based on the ambient light condition value, a column driver coupled to the controller to apply a reduced voltage value to each pixel region of a plurality of pixel regions at the adjusted first value and apply an increased voltage value to a backlight coupled to the controller at the adjusted second value, wherein the adjusted second value determines a lumen output of the backlight.

14. The method of claim 11, wherein the sensor comprises a temperature sensor for measuring a temperature condition of the display device, the method further comprising:

determining, by the controller, that a temperature condition value for the temperature condition measured by the temperature sensor is above an operating threshold value for a temperature operating condition; and causing, by the controller, based on the temperature condition value, a column driver coupled to the controller to apply a reduced voltage value to each pixel region of a plurality of pixel regions at the adjusted first value and apply an increased voltage value to a backlight coupled to the controller at the adjusted second value, wherein the adjusted second value determines a lumen output of the backlight.

15. The method of claim 11, wherein the controller is configured to control a state of a plurality of pixel regions of the electrowetting display device, the controller comprises a frame memory storing image data including a plurality of pixel data, each pixel data of the plurality of pixel data corresponding to a respective pixel region of a plurality of pixel regions, and the sensor comprises a brightness sensor for measuring a brightness condition of each pixel region of the plurality of pixel regions in an image content, the method further comprising:

comparing, by the controller, a brightness condition value for each pixel data to an operating threshold value for the brightness condition measured by the brightness sensor;

determining, by the controller, that a percentage of the plurality of pixel data does not exceed the operating threshold value for the brightness condition measured by the brightness sensor; and causing, by the controller, based on the brightness condition value, a column driver coupled to the controller to apply a reduced voltage value to each pixel region at the adjusted first value and apply an increased voltage value to a backlight coupled to the controller at the adjusted second value, wherein the adjusted second value determines a lumen output of the backlight.

* * * * *